UNITED STATES PATENT OFFICE.

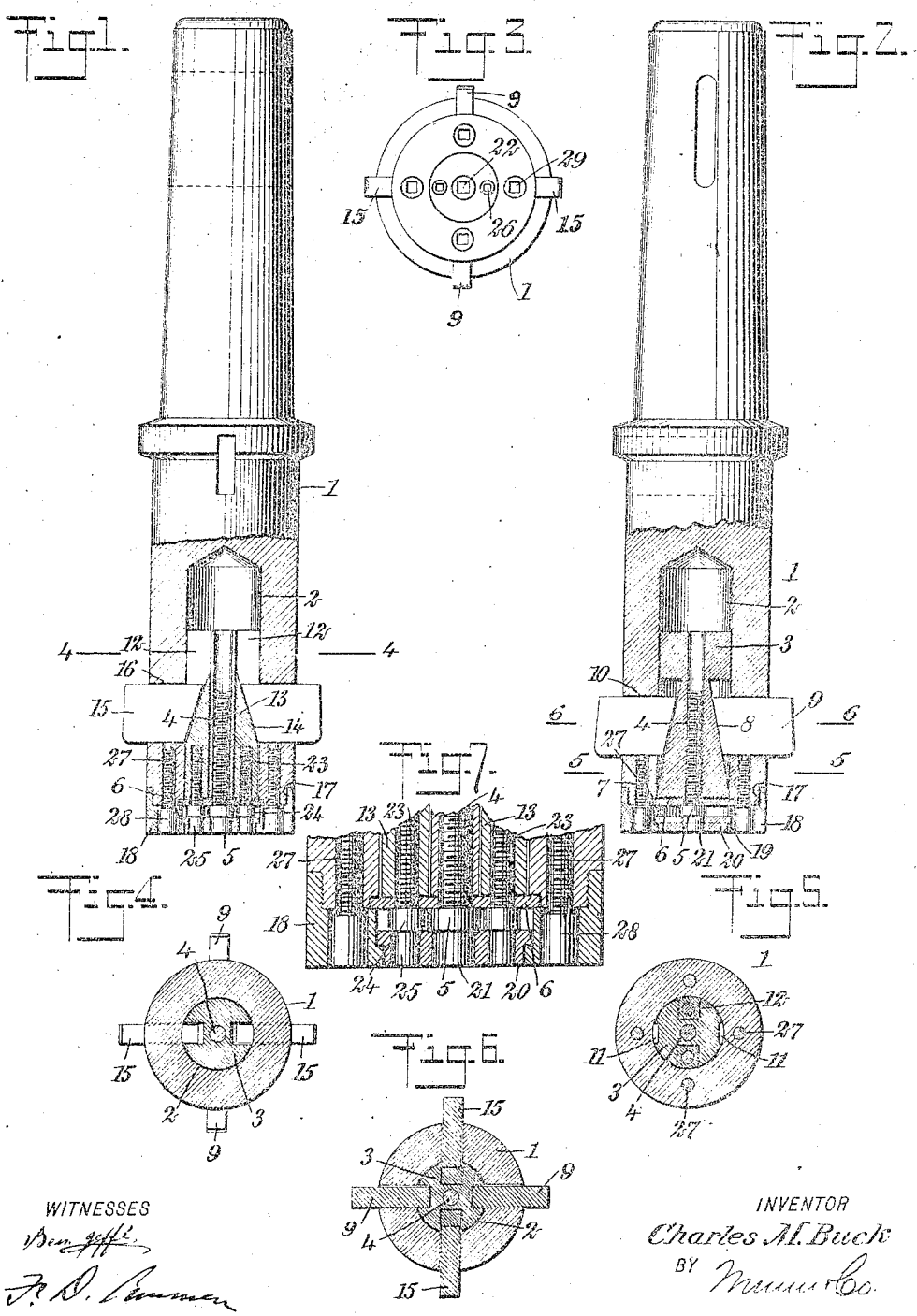

CHARLES MILTON BUCK, OF HUNTINGTON, WEST VIRGINIA.

EXPANSION CUTTER-HEAD FOR BORING-BARS.

No. 922,252.

Specification of Letters Patent.

Patented May 18, 1909.

Application filed June 16, 1908. Serial No. 438,736.

*To all whom it may concern:*

Be it known that I, CHARLES M. BUCK, a citizen of the United States, and a resident of Huntington, in the county of Cabell and State of West Virginia, have invented a new and Improved Expansion Cutter-Head for Boring-Bars, of which the following is a full, clear, and exact description.

This invention relates to cutter heads such as used on boring bars and similar devices for performing boring operations.

The device is intended especially to be used in boring the hubs of car wheels, though it is capable of use for other purposes.

The object of the invention is to produce a cutter head having simple means for mounting and adjusting the cutters therein.

The invention consists in the construction and combination of parts to be more fully described hereinafter and particularly set forth in the claims.

Reference is to be had to the accompanying drawings forming a part of this specification in which similar characters of reference indicate corresponding parts in all the figures.

Figure 1 is a side elevation of a cutter head constructed according to my invention, the lower portion of the head being shown in cross section; Fig. 2 is a view similar to Fig. 1, and showing the cutter head in cross section, the section being taken in a plane at right angles to the plane of Fig. 1; Fig. 3 is a bottom plan view of the cutter head; Fig. 4 is a cross section taken on the line 4—4 of Fig. 1;
Fig. 5 is a cross section on the line 5—5 of Fig. 2; Fig. 6 is a cross section on the line 6—6 of Fig. 2; and Fig. 7 is a vertical section taken at the lower end of the cutter head upon an enlarged scale, and especially illustrating the adjusting and clamping devices for the cutters.

Referring more particularly to the parts, 1 represents the cutter head which is in the form of a mandrel, adapted to be attached to a boring bar or boring spindle. The forward end of the cutter head, that is, the lower end, is illustrated in Figs. 1 and 2 as provided with a central bore 2, and in this bore there is slidably mounted a wedge block
3. This wedge block 3 is adjusted by means of an adjusting screw 4 which passes into the same from the lower end, said adjusting screw being provided with a head 5 which seats against the outer face of a center plate
6, and this center plate is seated in the lower end of the cutter head in a counterbore 7, as shown. On opposite sides, as shown in Fig. 2, the wedge block 3 is provided with inclined faces 8, and these faces abut against the rear ends of roughing cutters 9. These cutters project through the sides of the cutter head, passing through openings 10, as indicated, in Fig. 2. The inclined faces 8 constitute the bottoms of grooves 11 which are formed on opposite sides of the wedge block, and in a plane at right angles to these grooves deep grooves 12 are formed, extending longitudinally in the block. The bottoms of these grooves are not tapered, and they form guides for wedges or cotters 13, which present inclined faces 14 against the rear end of finishing cutters 15. These cutters 15 are formed similar to the cutters 9, and project from the wall of the cutter head, passing through openings 16, as indicated in Fig. 1. These openings 16 are midway between the openings 10 and farther from the cap plate 20. The end of the cutter head is threaded as indicated at 17, so as to enable a cap ring 18 to be attached. This cap ring has a large central opening with a rabbet cut groove 19, and this rabbet groove affords means for holding in position a cap or cap plate 20. This cap plate fits down upon the head 5 of the screw 4, as shown in Fig. 2, and beyond the head 5 the adjusting screw 4 is formed with a reduced neck 21 which is rotatably mounted in the cap, as will be readily understood. As shown in Fig. 3, this neck 21 has a square socket 22 which adapts it to be rotated by a square wrench. As indicated in Fig. 7, the inner edge of the ring 18 projects over the outer edge of the center plate 6 so as to retain the center plate in position. The wedges or cotters 13 are made adjustable by means of adjusting screws 23 which pass into the same through the center plate 6, and these adjusting screws are provided with enlarged heads 24, similar to the head 5, and disposed between the center plate 6 and the cap 20. They are also provided with reduced necks 25, having square sockets 26 therein, see Fig. 3, which enables them to be adjusted by a square wrench, as will be readily understood. In the wall of the cutter head, longitudinally disposed set screws 27 are provided, which are in alinement with the cutters, which are adapted to seat upon the forward edges thereof, so as to clamp the cutters rigidly in position. These set screws have enlarged heads 28 which are rotatably mounted in the ring 18, and are formed with square sockets 29, see Fig. 3, for the application of a wrench.

In order to adjust the roughing cutters 9 outwardly, it is only necessary to rotate the adjusting screw 4 in a left-hand direction, the screw being represented as having a right-hand thread. This rotation will advance the wedge block 3 inwardly in the bore 2, and the inclined faces 8 will move the cutters slightly outwardly. After they are adjusted to the proper point, the set screws which engage their edges will be rotated so as to clamp the cutters rigidly in position. Attention is called to the fact that the adjustment of these cutters 9 is entirely independent of the adjusting of the cutters 15, and either pair of cutters may be adjusted independently of the other. In order to adjust the finishing cutters 15, the adjusting screws 23 will be rotated so as to advance the cotters 13, and after the cutters 15 have been adjusted outwardly sufficiently they will be clamped rigidly in position by their corresponding set screws. In this way a very simple and easily adjusted boring bar cutter head is produced.

In considering the operation of adjusting the cutters, attention is called to the functions of the center plate 6 and the cap 20 which take the thrust of the heads of the adjusting screws. The heads of the screws thrust against the cap 20, forcing the wedge block inwardly, and thrust against the center plate 6 drawing the wedge block and cotters outwardly.

Having thus described my invention, I claim as new and desire to secure by Letters Patent,—

1. A cutter head having a bore with openings in the wall thereof, a wedge block slidably mounted in said bore and having inclined faces disposed opposite to a pair of said openings, roughing cutters mounted in a pair of said openings and seating against said inclined faces, means for adjusting said wedge block in said bore, cotters mounted on the sides of said wedge block between said inclined faces, means for adjusting said cotters, said cotters having inclined faces, and finishing cutters passing through another pair of openings and seating against said cotters.

2. A cutter head having a bore therein with a pair of oppositely disposed openings in the wall of said bore, roughing cutters disposed in said openings and projecting from said cutter head, said cutter head having a second pair of openings disposed between said first openings, finishing cutters mounted in said openings, a wedge block slidably mounted in said bore and having inclined faces abutting the rear ends of said roughing cutters, cotters adjustably mounted on the sides of said wedge block and having inclined faces abutting the rear faces of said finishing cutters, means for adjusting said wedge block, and independent means for adjusting said cotters.

3. A cutter head having a bore therein, a plate closing the end of said bore, a wedge block slidably mounted in said bore, an adjusting screw passing through said plate and engaging said wedge block to adjust the same, cotters slidably mounted on said wedge block, adjusting screws engaging said cotters and passing through said plate, and cutters mounted in the wall of said head engaging said wedge block and said cotters, and adapted to be adjusted outwardly thereby.

4. A cutter head having a bore therein, a plate closing the end of said bore, a wedge block slidably mounted in said bore, an adjusting screw passing through said plate and engaging said wedge block to adjust the same, cotters slidably mounted on said wedge block, adjusting screws engaging said cotters and passing through said plate, cutters mounted in the wall of said head engaging said wedge block and said cotters, and adapted to be adjusted outwardly thereby, a ring retaining said plate, and set screws passing through said ring mounted in said cutter head and engaging said cutters to clamp the same.

5. A cutter head having a bore therein, a wedge block mounted to slide in said bore and having oppositely disposed inclined faces, cutters extending through the wall of said cutter head and engaging said inclined faces so as to be adjusted thereby, guide grooves in the sides of said wedge block, cotters sliding in said guide grooves and having inclined faces, cutters projecting through the wall of said cutter head and seating against said cotters to be adjusted thereby, a center plate closing the outer end of said bore, adjusting screws passing through said center plate and engaging said wedge block to adjust the same, other adjusting screws passing through said center plate and engaging said cotters to adjust the same, means for retaining said center plate, and means for clamping said cutters.

6. A cutter head having a bore therein, a wedge block sliding in said bore and having inclined faces, cutters extending through the wall of said cutter head and abutting said inclined faces, cotters guided on the sides of said wedge block and having inclined faces, other cutters projecting through the wall of said cutter head and abutting the inclined faces of said cotters, a center plate mounted in the end of said bore, adjusting screws passing through said plate engaging said wedge block and said cotters respectively for adjusting the same, said adjusting screws having heads seating against said plate, a ring mounted on the end of said cutter-head retaining said plate and a cap retained by said ring and disposed over said plate, said adjusting screws having reduced necks rotatably mounted in said cap, said necks having a form adapted to receive a wrench for rotating said adjusting screws.

In testimony whereof I have signed my name to this specification in the presence of two subscribing witnesses.

CHARLES MILTON BUCK.

Witnesses:
L. M. ROE,
SIDNEY F. ENSIGN.